Figure 1:
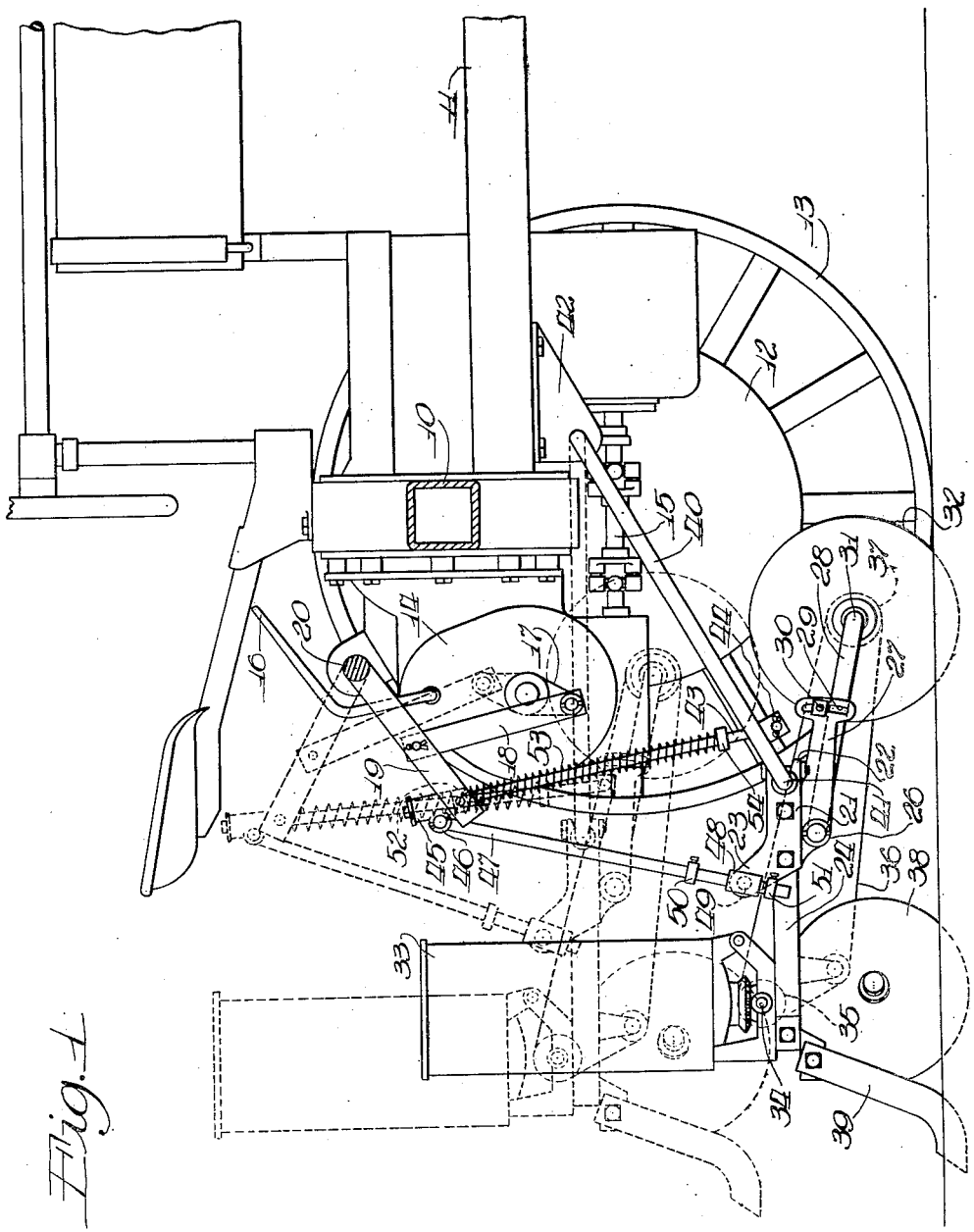

Sept. 15, 1936.  A. A. SCARLETT  2,054,524
IMPLEMENT ATTACHMENT FOR TRACTORS
Filed May 5, 1934  2 Sheets-Sheet 1

Inventor
Arthur A. Scarlett
By V. F. Sprague
Atty.

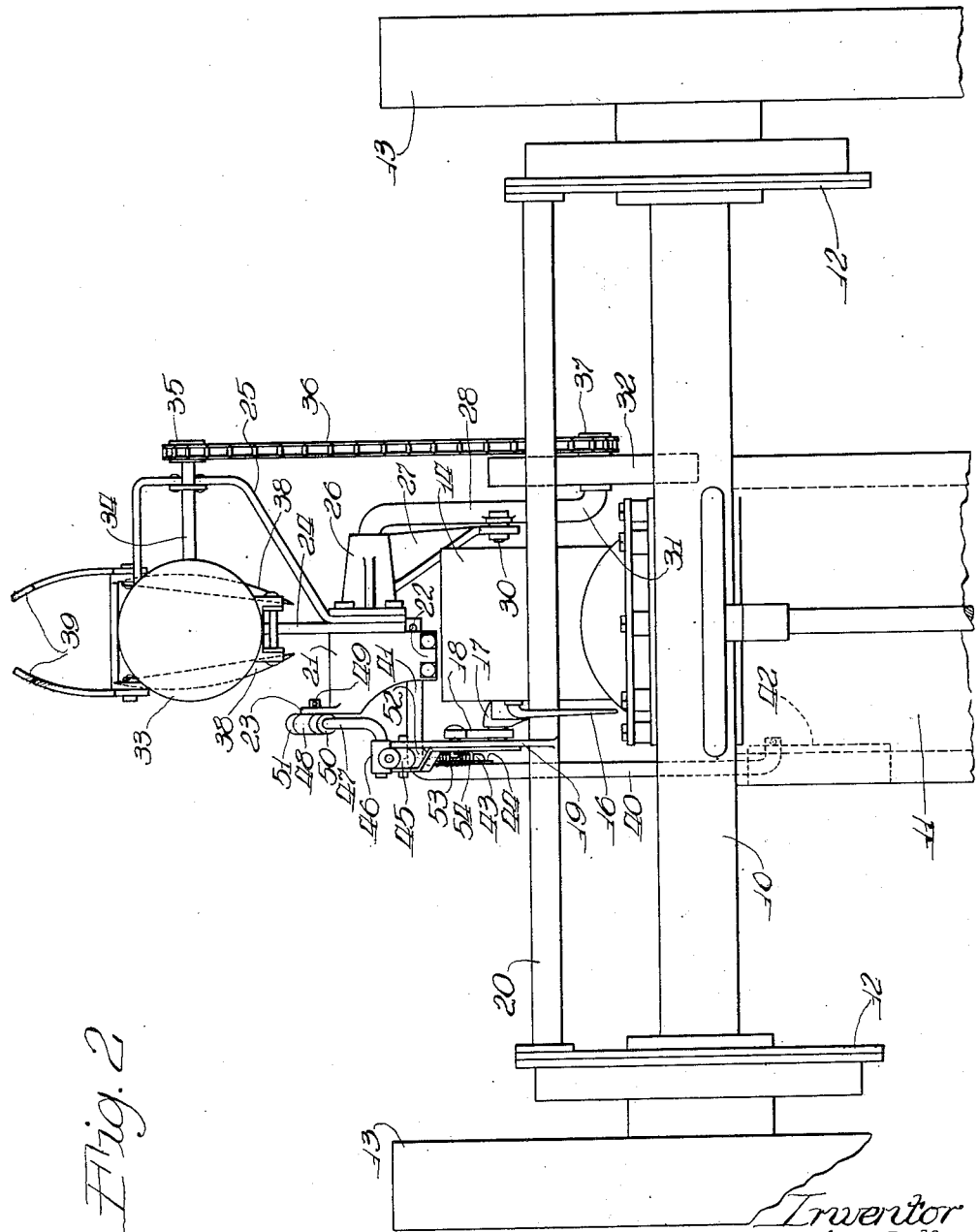

Patented Sept. 15, 1936

2,054,524

UNITED STATES PATENT OFFICE 2,054,524

IMPLEMENT ATTACHMENT FOR TRACTORS

Arthur A. Scarlett, Hamilton, Ontario, Canada, assignor, by mesne assignments, to International Harvester Company, Chicago, Ill., a corporation of New Jersey Application May 5, 1934, Serial No. 724,138

16 Claims. (Cl. 97—50)

The present invention relates to implement attachments for farm tractors and more particularly to a planter attachment and the manner of connecting same to the tractor.

The principal objects of the invention are to provide a form of connection between an implement frame and a tractor that will maintain the implement frame in substantially level or horizontal position when lifted to transport position, and also have provision for permitting the implement frame, when in its operative position, to be either rigidly or pivotally connected to its draft connections as soil conditions or the character of the implement carried by the frame determine. Another object is to provide a planting device on such a frame driven from a ground wheel mounted on the frame and yieldably held in engagement with the ground.

The foregoing and other objects and advantages are attained by the structural embodiment of the invention hereinafter more specifically described and illustrated in the accompanying drawings, where:

Figure 1 is a side view of a planter attachment mounted on the rear axle structure of a tractor, the axle being shown as sectioned for better view of the attachment; and Figure 2 is a plan view of the structure shown in Figure 1.

In the present instance the invention has been illustrated in connection with a row crop tractor of the wide tread rear axle type, the planting unit here shown being suitably located to permit other lateral units (not shown) to be mounted forwardly on the tractor. A tractor of the type stated comprises a transverse differential and axle housing 10 to which the central body 11 of the tractor is secured. The axle housing 10 has end housings 12 secured to each end thereof containing reducing gears which drive the traction wheels 13. The tractor is preferably equipped with power lift mechanism of the half revolution clutch type contained in a casing 14 mounted on the center of the differential and axle housing. The clutch is driven by a power takeoff shaft 15 connected to the transmission of the tractor and is controlled by a trip lever 16 located adjacent the driver's seat on the tractor. Actuation of the lift clutch causes a half revolution of a crank 17 on one side of the casing which is connected by a link 18 with a rearwardly extending lift arm 19 secured on a rock shaft 20 mounted in bearings on the end housings 12.

The attachment consists of an implement carrying frame which is shown as having a forward body or casting 21 formed with a transverse bearing 22 on its forward end and with an upwardly and rearwardly extending arm or lug 23 at one side. At the opposite side, the casting 21 has rearwardly extending frame bars 24 and 25 bolted or otherwise secured to it, together with a laterally extending socket or bearing 26 formed with a rigid forward arm 27. The bearing 26 receives the rear angularly bent end of a forwardly extending wheel carrying crank-axle or arm 28 which lies adjacent the arm 27. (Fig. 2.) The end of the arm 27 has an enlarged portion formed with a vertical slot 29 (Fig. 1) with which a set bolt 30 on the crank-axle engages. This allows the crank-axle 28 to be adjusted for depth as desired. The outwardly bent forward end of the crank axle constitutes a spindle 31 for a ground wheel 32. The bars 24 and 25 form a rectangular open frame, as seen in Figure 2, which supports planting mechanism comprising the usual hopper 33 having seed dispensing mechanism in its base, which is driven by the transverse drive shaft 34 supported at its outer end on the frame bar 25 and provided with a sprocket 35 driven by a sprocket chain 36 which is in engagement with a sprocket pinion 37 secured to the hub of the ground wheel 32. The usual disk openers 38 and coverers 39 are carried by the implement frame beneath the hopper. The implement frame just described is pivotally connected to the tractor by means of a draft member or link 40 which has its rear end bent inwardly as at 41, and journaled in the bearing 22 on the frame. The forward end of the draft member 40 is pivotally mounted, on a transverse axis, in a bracket 42 secured to the tractor body just forward of the axle housing, the shape and location of the draft member 40 being such that it will clear the casing of the power lift device when the implement frame is lifted.

In order to lift and lower the implement frame and control its pivotal movement, a lifting link or rod 43 is pivotally connected at its lower end in a suitable bracket 44 secured to the rear portion of the draft member 40. At its upper end, the lifting link or rod 43 has fixed to it a bracket member or sleeve 45 which is formed with a transverse bearing or sleeve 46 on its rear side. The sleeve 46 pivotally receives the upper angularly bent end of a control rod 47 which extends downwardly in diverging relation to the lift rod 43 and slidingly engages an upright sleeve 48 having a lateral trunnion 49 which is pivotally mounted in a bearing opening in the lug or arm 23 of the frame. Adjustable set collars 50 and 51 above and below the sleeve 48 serve to modify the action of the control rod 47, as will be described. Below the fixed bracket 45 on the upper end of the lift rod 43, this rod is slidably engaged in a collar 52 which is pivotally supported on the end of the arm 19. A coil spring 53 is mounted on the lift rod 43 and is confined between the slidable collar 52 and a stop 54 on the lower portion of the lift rod.

With the construction and arrangement of parts above described, it will be seen that the control rod 47 can optionally be made to hold the implement frame in substantially rigid relation with the draft member 40 by setting the collars 50 and 51 against the opposite ends of the sleeve 48, or that by spacing the collars away from this sleeve, as illustrated in Figure 1, a lost motion connection is made and the implement frame, when in lowered position, will be allowed to have a certain amount of independent pivotal movement with respect to the draft member. This independent movement is desirable in connection with some implements such as the planting device shown. Regardless of the adjustment of the set collars 50 and 51, actuation of the lifting mechanism will cause the slidable collar 52 to engage the bracket 45 and cause the frame to be raised by the action of the pair of rods 43 and 47 in substantially level or parallel relation to the ground to the dotted line position shown in Figure 1. When the lifting mechanism is actuated to lower the frame, it will return to the full line position of Figure 1, as the arm 19 swings downwardly and the spring 53 will then act to yieldably resist upward movements of the implement frame as it travels over uneven surfaces of the soil.

The construction described constitutes a preferred embodiment of the invention and affords an implement attachment of simplified construction and capable of easy manipulation and adjustment to meet various requirements.

What is claimed is:

1. The combination with a tractor of an implement frame, seed planting means mounted thereon, a draft member pivotally connected to the tractor on a transverse axis and pivotally connected to the implement frame forward of said seed planting means, a rearwardly extending vertically swingable arm mounted on the tractor above and rearwardly of said draft member, and connecting means between said arm and the implement frame including pivotally interconnected lifting and level controlling rods for maintaining the implement frame in level position during vertical movements of said arm.

2. The combination with a tractor, of an implement frame having a forwardly extended portion, a ground wheel on said forwardly extended portion, seed planting means on the rear portion of the frame, a draft member pivotally connected to the tractor on a transverse axis and pivotally connected to the implement frame on a transverse axis located between said ground wheel and said seed planting means, lifting means on the tractor, and lifting connections between said lifting means and the draft member and implement frame respectively including means for maintaining the implement frame in level position during lifting and lowering thereof.

3. The combination with a tractor, of an implement frame, a draft member pivotally connected to the implement frame and to the tractor to permit movement of the draft member and implement frame vertically, lifting means therefor mounted on the tractor, a pair of rods connected together at their upper ends and having their lower ends spread apart and pivotally connected to the draft member and implement frame respectively, a slidable connection between the lifting means and the upper end of the rod that is connected to the draft member, a coil spring mounted on said rod and confined between said slidable connection and a stop on the lower portion of the rod, and a lost motion connection between the other rod and the implement frame.

4. The combination with a tractor, of an implement frame, a draft member pivotally connected to the implement frame and to the tractor to permit movement of the draft member and implement frame vertically, lifting means therefor mounted on the tractor, and a pair of rods pivotally connected at their upper ends to the lifting means and pivotally connected at their lower ends to the draft member and implement frame respectively, the connection between said rods and the lifting means being yieldable to permit independent upward movement of the draft member and implement frame.

5. The combination with a tractor, of an implement frame, a draft member pivotally connected to the implement frame and to the tractor to permit relative movement of the draft member and implement frame vertically, lifting means therefor mounted on the tractor, a pair of rods connected at their upper ends to the lifting means and connected at their lower ends to the draft member and implement frame respectively to permit the relative movement of the aforesaid draft member and implement frame, and means carried by one of said rods for optionally locking the draft member and implement frame against movement relatively to each other.

6. The combination with a tractor, of an implement frame, a rearwardly extending vertically swingable lift arm on the tractor, a draft member pivotally connecting the implement frame with the tractor for movement vertically, a lift rod pivotally connected to the rear portion of the draft member and connected to the end of the lift arm by a slidable element, a control rod connected to the upper end of the lift rod by an element forming a stop for the lift arm, a connection between the lower end of said control rod and the implement frame, and means for swinging the lift arm to lift and lower the implement frame.

7. The combination with a tractor, of an implement frame, a transverse rock-shaft on the tractor, a crank-arm on the rock-shaft having an upright collar pivotally mounted on its outer end, a draft member pivotally connecting the implement frame with the tractor for movement vertically, a lift rod connected to the rear portion of the draft member and slidably received at its upper end in said upright collar, a socket member fixed on the upper end of the lift rod above the collar and forming a stop therefor, a control rod connected to said socket member and slidably engaged with the implement frame at a point spaced rearwardly of the lift rod, and means for rocking the rock-shaft to lift and lower the implement frame.

8. The combination with a tractor, of an implement frame, soil engaging means mounted thereon, a draft member pivotally connected to the tractor on a transverse axis and pivotally connected to the implement frame forward of the soil engaging means, a rearwardly extending swingable arm mounted on the tractor above and rearwardly of said draft member, connecting means between said arm and the implement frame including lifting means and means for maintaining the implement frame in level position during vertical movements of said arm, the aforesaid lifting means being pivotally connected to the means for maintaining the implement frame level, and means operated from the power of the tractor for raising and lowering said implement frame.

9. The combination with a tractor of an implement frame, soil engaging means mounted thereon, a draft member pivotally connected to the tractor on a transverse axis and pivotally connected to the implement frame forward of the soil engaging means, a rearwardly extending swingable arm mounted on the tractor above and rearwardly of said draft member, connecting means between said arm and the implement frame including lifting means and means for maintaining the implement frame in level position during vertical movements of said arm, the aforesaid lifting means being pivotally connected to the means for maintaining the implement frame level, and clutch means of the one-half revolution type operated from the power of the tractor for raising and lowering said implement frame.

10. A planting attachment for tractors having a power-lift attachment and a draft connection, comprising a frame, planting mechanism mounted thereon, a draft member for pivotally connecting the frame member to said tractor draft connection, a transverse shaft, bearing means for pivotally connecting said shaft to the tractor, a rearwardly extending lift arm secured to said transverse shaft, means for connecting said lift arm to said power-lift for oscillating said transverse shaft, and connecting means between said lift arm and the implement frame including lifting means and means for maintaining the implement frame in level position during vertical movements of said arm, the aforesaid lifting means being pivotally connected to the means for maintaining the implement frame level.

11. A planting attachment for tractors having a power-lift attachment and a draft connection, comprising a frame, planting mechanism mounted thereon, a draft member for pivotally connecting the frame member to said tractor draft connection, lifting means mounted on said tractor, a pair of rods connected together at their upper ends and having their lower ends spread apart and pivotally connected to the draft member and implement frame respectively, a slidable connection between the lifting means and the upper end of the rod that is connected to the draft member, a coil spring mounted on said rod and confined between said slidable connection and a stop on the lower portion of the rod, and a lost motion connection between the other rod and the implement frame.

12. An implement attachment for tractors having a power-lift attachment and a draft connection, comprising a frame, planting mechanism mounted thereon, a forwardly mounted ground wheel pivotally mounted on said frame for driving said planter mechanism, a draft member for pivotally connecting the frame member to said tractor draft connection, lifting means mounted on said tractor for connecting to said power-lift attachment, a pair of rods connected together at their upper ends to said lifting means and having their lower ends spread apart and pivotally connected to the draft member and implement frame respectively whereby the implement frame may be maintained in a level position during the operation of the lifting means.

13. An implement attachment for tractors having a power-lift attachment and a draft connection, comprising a frame, planter mechanism mounted thereon, means for driving said planter mechanism, a draft member for pivotally connecting the frame member to said tractor draft connection to permit relative movement of the draft member and implement frame vertically, lifting means therefor mounted on the tractor, a pair of rods connected at their upper ends to the lifting means and connected at their lower ends to the draft member and implement frame respectively to permit the relative movement of the aforesaid draft member and implement frame, and means carried by one of said rods for optionally locking the draft member and implement frame against movement relatively to each other.

14. An implement attachment for tractors having a power-lift attachment and a draft connection, comprising a frame, soil engaging means mounted thereon, a draft member pivotally connecting the implement frame with the tractor for movement vertically, lifting means oscillatingly connected to the tractor having a slidable element, a lift rod pivotally connected to the rear portion of the draft member and connected to the lifting means by the slidable element, a control rod connected to the upper end of the lift rod by an element forming a slot for the lift arm, a connection between the lower end of said control rod and the implement frame, and means for connecting said lifting means to said power-lift attachment.

15. An implement attachment for tractors having a power-lift attachment and a draft connection, comprising a frame, soil engaging means mounted thereon, a draft member pivotally connecting the implement frame with the tractor for movement vertically, lifting means oscillatingly connected to the tractor having an upright collar pivotally mounted thereon, a lift rod connected to the rear portion of the draft member and slidably received at its upper end in said upright collar, a socket member fixed on the upper end of the lift rod above the collar and forming a stop therefor, a control rod connected to said socket member and slidably engaged with the implement frame at a point spaced rearwardly of the lift rod, and means for connecting said lifting means to said power-lift attachment.

16. An implement attachment for tractors having a power-lift attachment and a draft connection, comprising a frame, soil engaging means mounted thereon, a draft member for pivotally connecting the frame member to said tractor draft connection, lifting means mounted on said tractor, a pair of rods connected together at their upper ends and having their lower ends spread apart and pivotally connected to the draft member and implement frame respectively, a slidable connection between the lifting means and the upper end of the rod that is connected to the draft member, a coil spring mounted on said rod and confined between said slidable connection and a stop on the lower portion of the rod, and a lost motion connection between the other rod and the implement frame.

ARTHUR A. SCARLETT.